(12) United States Patent
Kushner et al.

(10) Patent No.: US 11,846,088 B2
(45) Date of Patent: Dec. 19, 2023

(54) AUTOMATIC VEHICLE SPEED CONTROL SYSTEM

(71) Applicant: Caterpillar Inc., Peoria, IL (US)

(72) Inventors: Jeremy Kushner, Raleigh, NC (US); Christopher M. Elliott, Apex, NC (US); Sudarshan A. Maiyur, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 121 days.

(21) Appl. No.: 17/444,299

(22) Filed: Aug. 3, 2021

(65) Prior Publication Data

US 2023/0044841 A1 Feb. 9, 2023

(51) Int. Cl.
| | | |
|---|---|---|
| *E02F 9/22* | (2006.01) | |
| *B60K 25/00* | (2006.01) | |
| *B60K 31/00* | (2006.01) | |
| *B60W 30/14* | (2006.01) | |
| *B60W 30/18* | (2012.01) | |
| *E02F 9/20* | (2006.01) | |
| *E02F 9/26* | (2006.01) | |

(52) U.S. Cl.
CPC ............ *E02F 9/2253* (2013.01); *B60K 25/00* (2013.01); *B60K 31/00* (2013.01); *B60W 30/146* (2013.01); *B60W 30/18063* (2013.01); *E02F 9/2025* (2013.01); *E02F 9/26* (2013.01); *B60K 2031/0091* (2013.01); *B60W 2510/30* (2013.01); *B60W 2540/215* (2020.02)

(58) Field of Classification Search
CPC ........ E02F 9/2253; E02F 9/26; E02F 9/2025; B60K 25/00; B60K 31/00; B60K 2031/0091; B60W 30/146; B60W 30/18063; B60W 2510/30; B60W 2540/215
See application file for complete search history.

(56) References Cited

U.S. PATENT DOCUMENTS

| | | | |
|---|---|---|---|
| 6,918,854 B2* | 7/2005 | Okada ............ | B60W 30/18027 477/93 |
| 7,832,126 B2 | 11/2010 | Koellner et al. | |
| 7,988,593 B2* | 8/2011 | Staub ............. | B60W 30/18063 318/140 |

(Continued)

FOREIGN PATENT DOCUMENTS

| | | |
|---|---|---|
| EP | 0408170 | 1/1991 |
| EP | 2413005 | 2/2012 |

OTHER PUBLICATIONS

Caterpillar, AdvancedDisplayUserGuideforSkidSteer, Compact-trackandMulti-TerrainLoaders, p. 1-34, Nov. 2019, Retrieved online at https://s7d2.scene7.com/is/content/Caterpillar/CM20191127-28659-69c 10.*

(Continued)

*Primary Examiner* — Tyler J Lee
(74) *Attorney, Agent, or Firm* — Bookoff McAndrews, PLLC

(57) ABSTRACT

An automatic vehicle speed control system for use in a vehicle having an implement is disclosed. The automatic vehicle speed control system includes: a controller configured to: set a speed of the vehicle to a creep setting; monitor one or more operating conditions of the implement; and automatically adjust the speed of the vehicle based on the one or more operating conditions of the implement.

20 Claims, 5 Drawing Sheets

(56) References Cited

U.S. PATENT DOCUMENTS

| | | | |
|---|---|---|---|
| 9,435,105 B2 | 9/2016 | Fleischmann et al. | |
| 9,573,579 B2* | 2/2017 | Johri | B60W 30/18063 |
| 9,598,837 B2 | 3/2017 | Fletcher et al. | |
| 9,605,414 B2 | 3/2017 | Yamada et al. | |
| 9,663,108 B2* | 5/2017 | Heisel | B60W 30/18063 |
| 9,821,658 B1* | 11/2017 | Kim | B60W 10/02 |
| 9,920,613 B2 | 3/2018 | Lee et al. | |
| 10,227,753 B2 | 3/2019 | Robertson et al. | |
| 10,486,697 B2* | 11/2019 | Ogura | F16H 61/00 |
| 10,517,434 B2 | 12/2019 | Lammers et al. | |
| 10,960,882 B2* | 3/2021 | Ruybal | B60W 20/10 |
| 2003/0171186 A1* | 9/2003 | Okada | B60W 10/04 |
| | | | 477/71 |
| 2006/0129280 A1 | 6/2006 | Thomas et al. | |
| 2009/0203496 A1* | 8/2009 | Staub | B60W 30/18063 |
| | | | 701/87 |
| 2011/0078929 A1 | 4/2011 | Hartwick et al. | |
| 2012/0071296 A1* | 3/2012 | Miyamoto | B60L 7/14 |
| | | | 477/27 |
| 2013/0090799 A1* | 4/2013 | Nakamura | B60L 50/51 |
| | | | 701/22 |
| 2013/0195681 A1* | 8/2013 | Meehan | E02F 9/2289 |
| | | | 417/53 |
| 2015/0224976 A1* | 8/2015 | Wang | B60W 10/18 |
| | | | 903/902 |
| 2015/0266478 A1* | 9/2015 | Takahashi | B60W 10/08 |
| | | | 701/22 |
| 2016/0016580 A1* | 1/2016 | Johri | B60W 10/18 |
| | | | 180/65.265 |
| 2016/0090832 A1 | 3/2016 | Mock | |
| 2016/0145836 A1* | 5/2016 | Yamada | E02F 9/202 |
| | | | 701/50 |
| 2017/0327005 A1* | 11/2017 | Meyer | B60L 15/2063 |
| 2018/0319398 A1* | 11/2018 | Ogura | B60W 10/103 |
| 2018/0326845 A1* | 11/2018 | Ogura | G05G 7/04 |
| 2019/0161081 A1* | 5/2019 | Ogura | B60W 30/14 |
| 2019/0161940 A1* | 5/2019 | Takeda | E02F 9/22 |
| 2020/0398844 A1* | 12/2020 | Ruybal | B60W 10/119 |
| 2020/0407951 A1* | 12/2020 | Daimon | E02F 9/264 |

OTHER PUBLICATIONS

Written Opinion and International Search Report for Int'l. Patent Appln. No. PCT/US2022/038274, dated Nov. 25, 2022 (11 pgs).

* cited by examiner

AUTOMATIC VEHICLE SPEED CONTROL SYSTEM

TECHNICAL FIELD

The present disclosure relates generally to vehicles, and more particularly, to an automatic vehicle speed control system for such vehicles.

BACKGROUND

Vehicles, such as skid steers, wheel loaders, dozers, or other heavy equipment, can be used in many different applications or tasks, such as, for example, construction, agriculture, landscaping, mining, or the like. To perform these applications or tasks, implements or work tools are typically mounted to the vehicle and may connect to one or more of the vehicle's hydraulic mechanisms. Certain types of implements for the vehicle may include rotary or other hydraulic components that rotate or otherwise move for performing a given task. For such implements, it may be necessary to operate the implement in an optimal operating range for improving the performance of the implement. For example, the performance of the implement may be reduced if the implement is operated outside of the operating range. Further, some vehicles include a creep mode that allows an operator to set a predetermined maximum speed such that the vehicle does not exceed the predetermined maximum speed. The creep mode may help to ensure that the speed of the vehicle does not increase such that the operating conditions of the implement operate outside of the optimal operating range. However, ground conditions may change such that the predetermined maximum speed of the creep mode becomes insufficient or otherwise ineffective for maintaining the implement in the optimal operating range. Thus, the performance of the implement may be reduced and the rotary or hydraulic component of the implement may eventually stall if the implement is not brought back within the optimal operating range.

U.S. Patent Application Publication No. 2006/0129280 published to Thomas et al. on Jun. 15, 2006 ("the '280 publication"), describes a method of operating a vehicle including sensing at least one operational characteristic of a work tool indicative of current work tool performance. The method also includes altering operation of the vehicle in response to sensing at least one operational characteristic of a work tool to maintain a desired relationship between the at least one operational characteristic of the work tool and at least one operational characteristic of the vehicle. However, the '280 publication may not adequately ensure that the work tool operates in an optimal operating range in a creep mode and/or may not adequately reduce or prevent stall of the implement.

The automatic vehicle speed control system of the present disclosure may solve one or more of the problems set forth above and/or other problems in the art. The scope of the current invention, however, is defined only by the accompanying claims, and not by the ability to solve any specific problem.

SUMMARY

In one aspect, an automatic vehicle speed control system for use in a vehicle having an implement is disclosed. The automatic vehicle speed control system includes: a controller configured to: set a speed of the vehicle to a creep setting; monitor one or more operating conditions of the implement; and automatically adjust the speed of the vehicle based on the one or more operating conditions of the implement.

In another aspect, an automatic vehicle speed control system for use in a vehicle having an implement is disclosed. The automatic vehicle speed control system includes: a controller configured to: set a speed of the vehicle to a creep setting in a work direction; determine whether a stall condition exists for the implement; and in accordance with a determination that the stall condition exists, automatically move the vehicle to eliminate the stall condition.

In yet another aspect, a method for automatically controlling speed of a vehicle is disclosed. The method includes: setting a speed of the vehicle in a work direction to a creep setting; monitoring one or more operating conditions of an implement of the vehicle; automatically adjusting the speed of the vehicle based on the one or more operating conditions of the implement; determining whether a stall condition exists for the implement; and in accordance with a determination that the stall condition exists, automatically moving the vehicle in a non-work direction

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
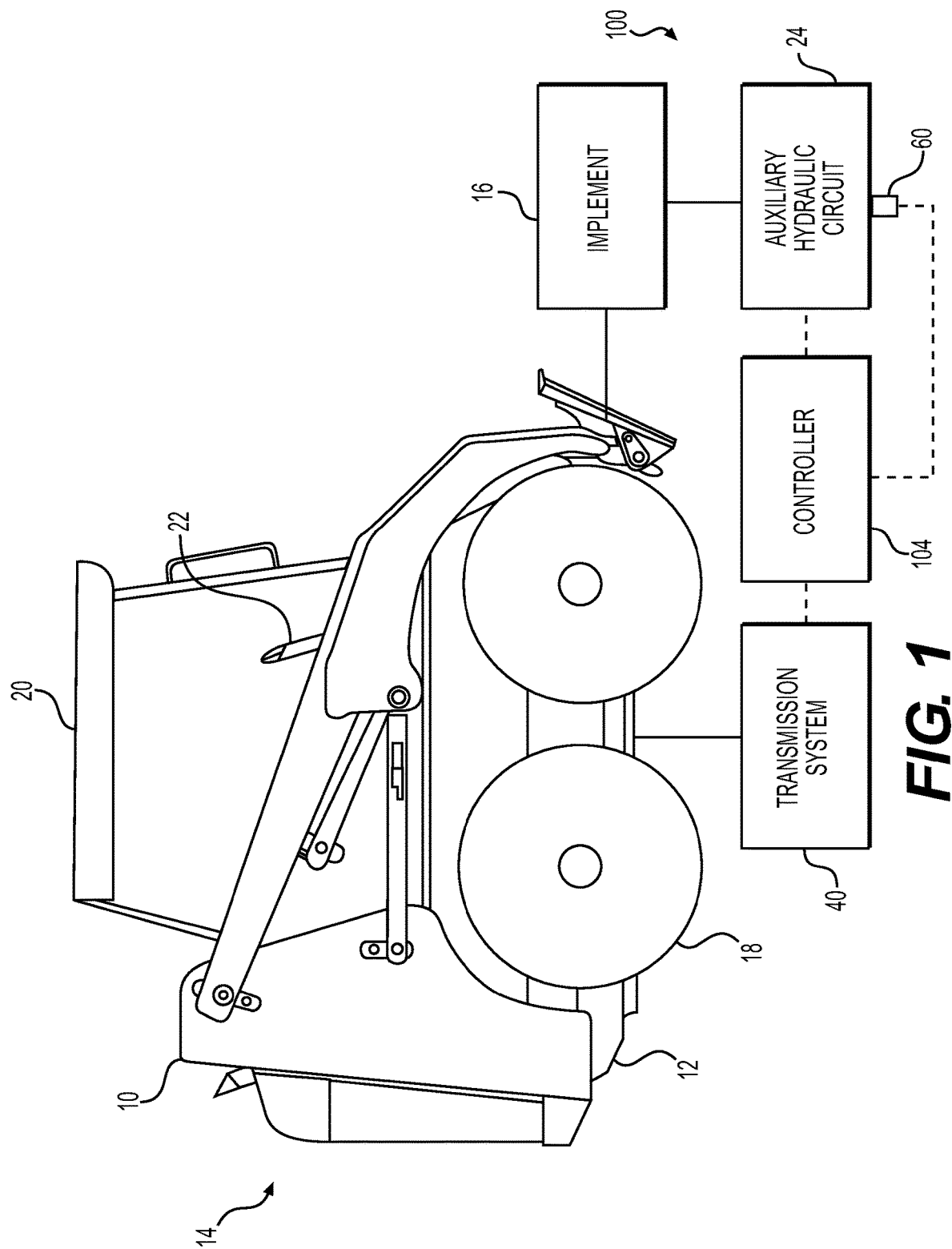
FIG. 1 is a schematic side view of a vehicle having an automatic vehicle speed control system, according to aspects of the disclosure.

FIG. 1 illustrates a schematic side view of a vehicle 10 having an automatic vehicle speed control system 100, according to aspects of the disclosure. The disclosure herein may be applicable to any type of vehicle, however, reference will be made below particularly to a skid steer. For example, vehicle 10 may include, but is not limited to, wheel dozers, wheel loaders, track loaders, backhoe loaders, compactors, forest machines, front end loaders, back wheel loaders, or the like. As shown in FIG. 1, vehicle 10 may include a frame 12, machinery 14, and an implement 16. Frame 12 generally supports the various assemblies and mechanical systems of the vehicle 10 and may be supported on a ground surface by transport mechanisms, such as wheels 18. As used herein, "wheels" and "transport mechanisms" may be used interchangeably. Wheels 18 may allow vehicle 10 to maneuver about the ground surface to a desired location for performing a task, such as cold planing, trenching, or the like. Frame 12 may support the machinery 14, which may include engines, motors, generators, batteries, pumps, air compressors, hydraulic fluid storage tanks, and/or any other equipment necessary to power and operate vehicle 10. Frame 12 may further support an operator cab 20, from which a user, or operator, may maneuver and control vehicle 10 and/or implement 16 via one or more operator interfaces 22, such as user interfaces, controls, and/or displays (not shown).

Implement 16 may be operatively attached to the front end of the vehicle 10. It is understood that implement 16 may be operatively attached to the back-end of the vehicle 10, and/or to the side, top, bottom, or any other location on the vehicle 10. Implement 16 may include any type of work tool that includes a rotary component or other component that utilizes hydraulic fluid or the like to perform a desired task. For example, implement 16 may include cold planers (e.g., a cutting or digging rotor), wheel saws, trenchers, snow blowers, brush cutters, compactors, augers, brooms, or the like. It is understood that implement 16 may be controlled by means other than hydraulic fluid, such as, for example, electric motors, pneumatics, solenoids, or the like. Further, it is understood that aspects of the disclosure may be used regardless of the application or task being performed by implement 16. Such applications or tasks may include, for example, cold planing, grinding, stockpiling, trenching, hammering, digging, raking, grading, material handling, snow removal, tilling soil, demolition work, cutting, sweeping, or the like.

As further shown in FIG. 1, vehicle 10 also includes an auxiliary hydraulic circuit 24 and a transmission system 40. The auxiliary hydraulic circuit 24 (shown schematically in FIG. 1) may supply a flow of hydraulic fluid to implement 16 to facilitate operation of the rotary or other hydraulic components of implement 16. For example, as described above, implement 16 may include one or more hydraulic components useful in performing a desired task. The hydraulic components of implement 16 may receive hydraulic fluid from the auxiliary hydraulic circuit 24 in a controlled manner. Thus, the auxiliary hydraulic circuit 24 may assist in adjusting the position of at least one aspect of implement 16 with respect to a reference point located on or off vehicle 10. For example, the auxiliary hydraulic circuit 24 may assist in rotating the rotary component of implement 16 at a feed rate or rotation speed.

Transmission system 40 (shown schematically in FIG. 1) may include, for example, a continuously variable transmission (CVT), a hybrid transmission, or the like. For example, transmission system 40 may include a hydraulic CVT, a hydro-mechanical CVT, an electric CVT, or the like. Transmission system 40 may include one or more driving elements (e.g., one or more pumps), and one or more driven elements (e.g., one or more motors), that are driven by the driving elements. Transmission system 40 may receive a power output from the engine (e.g., at the driving elements) and transmit the power output (e.g., via the driven elements) to the wheels 18. Thus, transmission system 40 may control a speed, or ground speed, of vehicle 10, independent of a speed of an engine of vehicle 10.

Automatic vehicle speed control system 100 includes a controller 104, such as an electronic control module (ECM), and a sensor system connected to controller 104. The sensor system may include one or more sensors for measuring operating conditions of implement 16, such as pressure sensors, position sensors, temperature sensors, flow sensors, speed sensors, or the like. For example, the sensor system may include one or more auxiliary hydraulic pressure sensors 60 (only one of which is depicted). Auxiliary hydraulic pressure sensor 60 may be located in auxiliary hydraulic circuit 24 and may sense values indicative of a pressure of hydraulic fluid in auxiliary hydraulic circuit 24. While the exemplary embodiment describes auxiliary hydraulic pressure sensors, it is understood that the sensor system may include any type of sensor for sensing various operating conditions of implement 16. For example, the sensor system may include implement speed sensors (not shown) for sensing values indicative of a speed of the rotary or hydraulic components of implement 16, position sensors (not shown) (e.g., rotary position sensors or linear position sensors) for measuring a position of the rotary or hydraulic components of implement 16, or the like. Sensor system may also include other sensors for measuring operating conditions of other components of vehicle 10, such as, for example, vehicle speed sensors for measuring values indicative of a speed and/or movement direction of vehicle 10. It is understood that the sensors of the sensor system may include any type of sensor such as resistive sensors, inductive sensors, capacitive sensors, piezoelectric sensors, optical sensors, micro electro-mechanical system sensors, or the like. Further, the sensor system may include physical sensors and/or virtual sensors (e.g., sensors that determine a value indirectly by controller 104 based on other sensed values) and may include any number and/or combination of sensors as necessary for sensing or measuring operating conditions.

Figure 2:
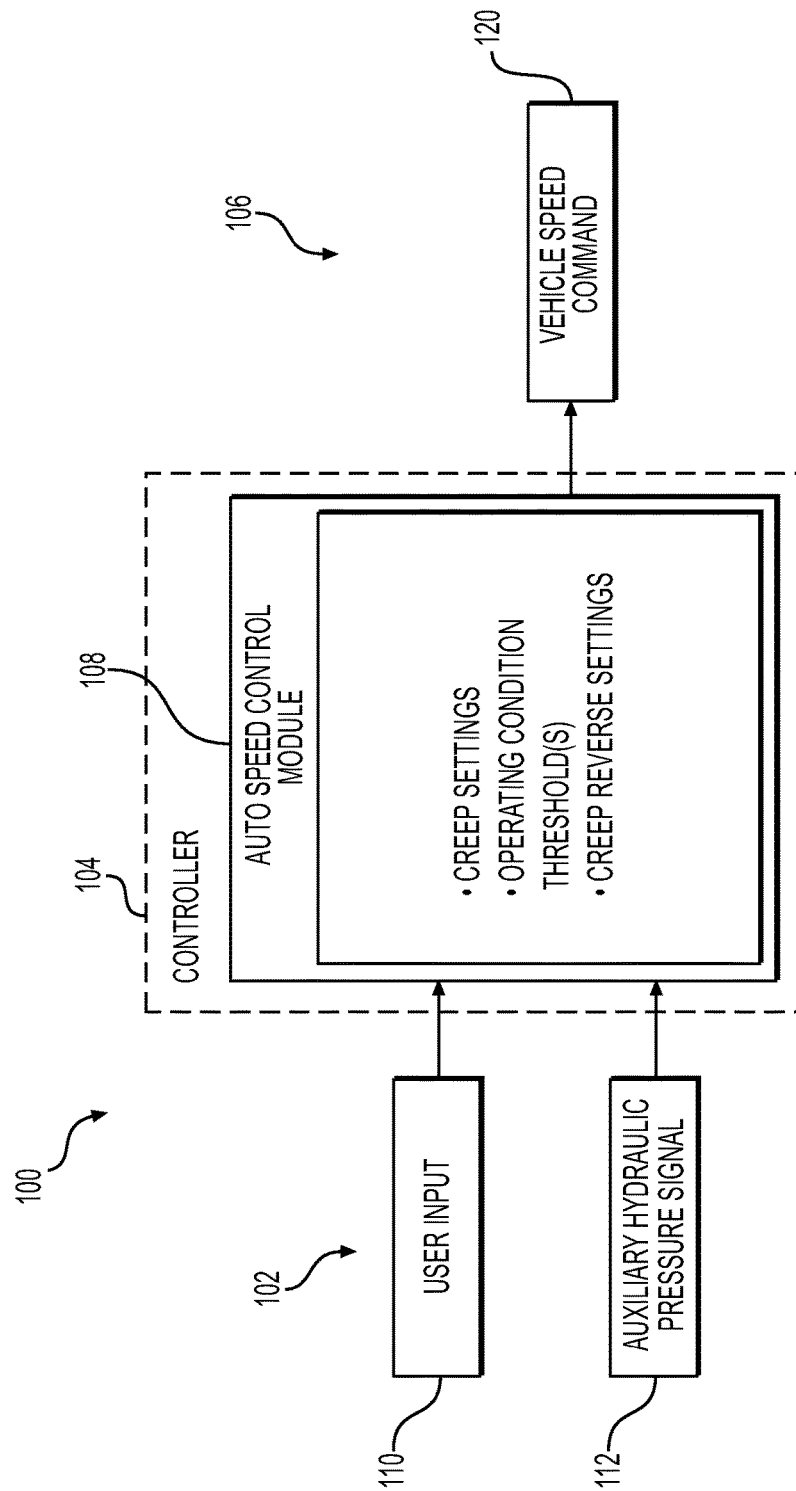
FIG. 2 is a schematic view of the exemplary automatic vehicle speed control system for the vehicle of FIG. 1.

FIG. 2 illustrates a schematic view of the exemplary automatic vehicle speed control system 100 for operation and/or control of at least portions of vehicles 10. As used herein, "creep" or a "creep mode" of the vehicle 10 includes an operation mode of the vehicle 10 during which a maximum speed of vehicle 10 is set to a reduced maximum speed (e.g., a percentage of a normal maximum travel speed) for a corresponding full speed control command input (e.g., joystick is moved 100%), without changing a speed of the engine. For example, the creep or creep mode may be used for operations or tasks (e.g., cold planing or trenching) that require slow, constant speed independent of engine speed. Thus, while operating in the creep mode, an operator may push the joystick or similar device to a full extent and the vehicle 10 will move at the set predetermined maximum speed rather than the normal maximum speed for the vehicle 10.

System 100 may include inputs 102, controller 104, and outputs 106. Inputs 102 may include, for example, user input 110 and auxiliary hydraulic pressure signal 112 from pressure sensor 60. User input 110 may include input of a type of implement 16, an automatic creep control command, an automatic creep reverse command, and/or a speed control command. As detailed further below, the automatic creep control command and/or the automatic creep reverse command includes input of one or more creep settings. The user input 110 may also include input of an override command for ending the automatic creep control command and/or the automatic creep reverse command. The user input may be received from one or more input devices (e.g., operator interfaces 22), such as joysticks or other speed control devices, buttons, switches, knobs, computing devices, number pads, or the like. Further, it is understood that inputs 102 may include any type of input, as necessary, for performing method 300 and/or method 400, described below. For example, inputs 102 may include signals from transmission system 40 (e.g., speed signals, pressure signals, etc.) and/or other signals from auxiliary hydraulic circuit 24 (e.g., speed signals, position signals, etc.).

Outputs 106 may include, for example, a vehicle speed command 120. Controller 104 also includes an auto speed control module 108. Auto speed control module 108 may receive inputs 102, implement methods 300, 400 for automatically controlling creep of vehicle 10 and control outputs 106, as described with reference to FIGS. 3 and 4 below.

Controller 104 may embody a single microprocessor or multiple microprocessors that may include means for automatically controlling creep of vehicle 10. For example, controller 104 may include a memory, a secondary storage device, and a processor, such as a central processing unit or any other means for accomplishing a task consistent with the present disclosure. The memory or secondary storage device associated with controller 104 may store data and/or software routines that may assist controller 104 in performing its functions, such as the functions of methods 300 and 400 of FIGS. 3 and 4. Further, the memory or secondary storage device associated with controller 104 may also store data received from the various inputs 102 associated with automatic vehicle speed control system 100. Numerous commercially available microprocessors can be configured to perform the functions of controller 104. It should be appreciated that controller 104 could readily embody a general machine controller capable of controlling numerous other machine functions. Alternatively, a special-purpose machine controller could be provided. Further, controller 104, or portions thereof, may be located remote from vehicle 10. Various other known circuits may be associated with controller 104, including signal-conditioning circuitry, communication circuitry, hydraulic or other actuation circuitry, and other appropriate circuitry.

Controller 104 may also include stored values for use by module 108. For example, the stored values may include creep settings, one or more operating condition thresholds, and/or creep reverse settings. The creep settings may include one or more predetermined maximum speed settings for a creep mode of the vehicle 10. For example, the creep settings may include a first creep setting having a first predetermined maximum speed, a second creep setting having a second predetermined maximum speed, and a third creep setting having a third predetermined maximum speed. It is understood that the creep settings may include any number of different predetermined maximum speed settings as desired. Further, the creep settings may include different settings for various types of implements. For example, the creep settings may include different predetermined maximum speed settings for different types of implements. For example, the creep settings may include a first set of creep settings for a first type of implement, a second set of creep settings for a second type of implement, and a third set of creep settings for a third type of implement. It is understood that the creep settings may include creep settings of any number of different types of implements as desired. As detailed above, the type of implement 16 may be input by user input 110, and/or the type of implement 16 may be detected by controller 104 automatically.

The operating condition thresholds may include one or more thresholds for various operating conditions of implement 16 for defining an optimal operating range of implement 16. For example, the operating condition thresholds may include one or more pressure thresholds for auxiliary hydraulic circuit 24. The pressure thresholds may include a first threshold and a second threshold that is different than the first threshold. The first threshold may be a low threshold and the second threshold may be a high threshold such that the optimal operating range of implement 16 is between the first threshold and the second threshold. As used herein, the "optimal operating range" of implement 16 includes a condition of the rotary or hydraulic component of implement 16 in which the component is operating at an optimal rotational speed or work output for maximizing productivity of the implement 16 without stalling the implement 16. The speed of vehicle 10 may be controlled to ensure implement 16 operates in the optimal operating range. For example, an operator may use the creep mode to set a predetermined maximum speed for operating the implement 16 in the optimal operating range. The operating condition thresholds may also include a stall threshold. The stall threshold may include a threshold for indicating a stall condition of implement 16. As used herein, "stall" or the "stall condition" is a condition of implement 16 in which the rotary or hydraulic component substantially reduces or substantially stops rotation and/or movement (e.g., the rotary component substantially stops rotating) based on a load on the implement 16. It is understood that the operating condition thresholds may include thresholds for any operating condition of implement 16, e.g., speed of the rotary or hydraulic component, position of the rotary or hydraulic component, etc.

The creep reverse settings may include one or more settings for controlling the vehicle 10 during an automatic creep reverse, detailed further below. For example, the creep reverse settings may include a predetermined reverse speed, a predetermined reverse distance, and/or a predetermined reverse time. As used herein, "reverse," the "reverse work direction," or the "non-work direction" may include a direction opposite of a work direction. The work direction is the direction of movement of vehicle 10 for operating implement 16. The work direction may include a forward direction (e.g., with respect to forward motion of vehicle 10), a reverse direction (e.g., with respect to reverse motion of vehicle 10), or any other movement direction or combination of directions of vehicle 10 for operating implement 16. Thus, the non-work, or reverse work, direction, may include a direction opposite to the work direction. For example, if the work direction is a forward direction of vehicle 10, the non-work direction may be the reverse direction of vehicle 10. Similarly, if the work direction is a reverse direction of vehicle 10, the non-work direction may be the forward direction of vehicle 10. It is understood that the work direction and the non-work direction may include any directions as desired for a specific type of implement 16. Further, the creep reverse settings may include different settings for various types of implements. For example, the creep reverse settings may include different predetermined reverse distance and/or predetermined reverse time values for different types of implements. Further, it is understood that the stored values may include any other stored and/or derived values for performing methods 300 and/or 400.

Vehicle speed command 120 output may include control of aspects of vehicle 10. Controller 104 may derive vehicle speed command 120 based on the creep settings and user inputs, as detailed below. Vehicle speed command 120 may be sent to transmission system 40 to control an output of transmission system 40 (e.g., to control an output of the pumps and/or motors of transmission system 40).

INDUSTRIAL APPLICABILITY

The disclosed aspects of the automatic vehicle speed control system 100 of the present disclosure may be used in any vehicle 10 having an implement 16 with a rotary or other moving component.

Referring to FIG. 1, during the operation of vehicle 10, an operator may control vehicle 10 to maneuver about the ground surface and perform tasks. While maneuvering, transmission system 40 may control the speed of vehicle 10 based on user input 110 from operator interfaces 22. When performing a task with implement 16 (e.g., cold planing, trenching, etc.), an operator may activate the creep mode of vehicle 10 such that the operator can set a desired predetermined maximum speed of vehicle 10 (e.g., the operator may select one of a first creep setting, a second creep setting, a third creep setting, etc.). As detailed above, the creep mode may enable the operator to input a maximum speed control command (e.g., via operator interfaces 22) and controller 104 may limit the actual maximum speed of vehicle 10 to the creep setting. In this way, the creep mode ensures the vehicle 10 moves at a speed for operating implement 16 in the optimal operating range. However, the necessary speed for operating the implement 16 in the optimal operating range may change if the ground conditions change, as detailed above. For example, if the ground surface becomes softer and/or harder, the implement 16 may operate below or above the optimal operating range (e.g., below the low threshold and/or above the high threshold) for the set predetermined maximum speed of vehicle 10. Accordingly, the vehicle 10 may need to move faster and/or slower, respectively, to operate the implement 16 in the optimal operating range. Thus, as detailed below with reference to FIG. 3, automatic vehicle speed control system 100 may automatically control the creep (e.g., the speed) of vehicle 10 to continue operating the implement 16 in the optimal operating range.

Figure 3:
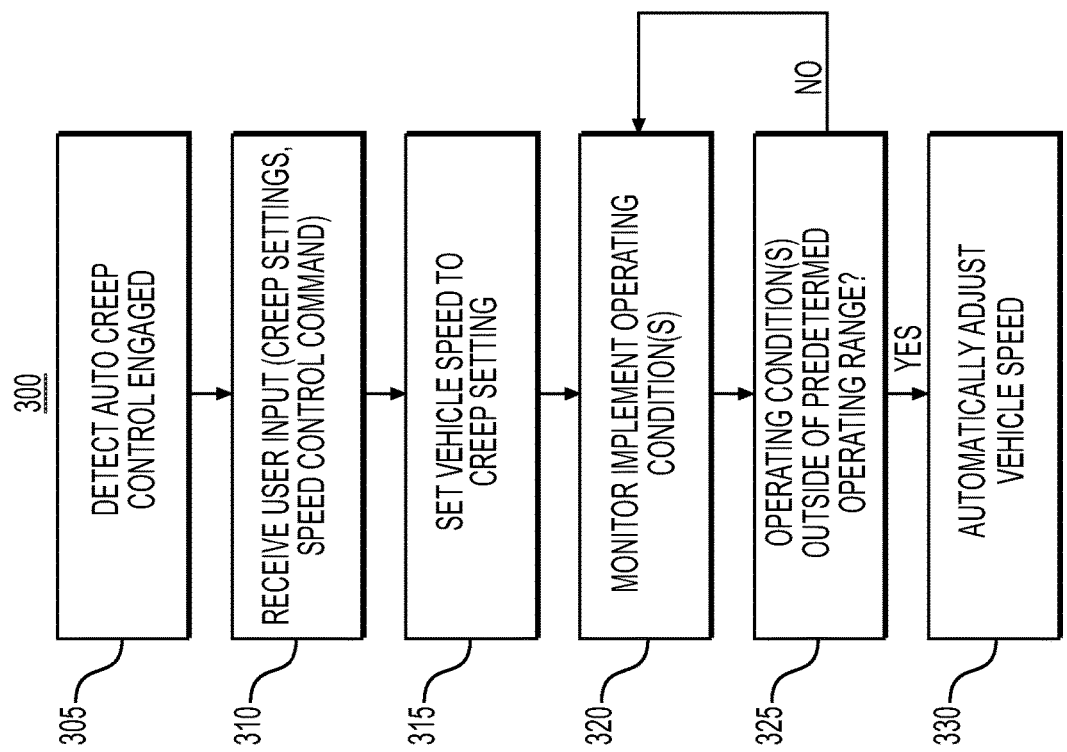
FIG. 3 provides a flowchart depicting an exemplary method for automatically controlling speed for the vehicle of FIG. 1.

FIG. 3 illustrates a flowchart depicting an exemplary method 300 for automatically controlling speed of vehicle 10. In step 305, module 108 may detect an automatic (auto) creep control command is engaged. For example, module 108 may receive user input 110 of the automatic creep control command via a switch, a button, a knob, a computer input, or the like. In some embodiments, the automatic creep control may be engaged by default (e.g., when the creep mode is engaged). Further, in some embodiments, the steps below (e.g., steps 310-330) may be performed without first detecting the auto creep control command is engaged. For example, steps 310-330 may be initiated by means other than engaging a creep mode of vehicle 10.

In step 310, when module 108 has detected auto creep control is engaged, module 108 may receive the user input 110 of the creep settings and the speed control command. For example, module 108 may receive the set predetermined maximum speed setting selected by the operator via operator interfaces 22. Further, module 108 may receive the speed control command via the operator interfaces 22 (e.g., via joysticks or the like). The speed control command may be a percentage of the set predetermined maximum speed setting. For example, a 100% speed control command may correspond to the set predetermined maximum speed setting, a 50% speed control command may correspond to 50% of the set predetermined maximum speed setting, etc.

In step 315, module 108 may set the speed of vehicle 10 to the creep setting (e.g., to the predetermined maximum speed or a percentage thereof). For example, module 108 may output a vehicle speed command 120 and send the vehicle speed command 120 to transmission system 40 for controlling output of transmission system 40, as detailed above, and thus controlling the speed of vehicle 10. Module 108 may set the speed based on the set predetermined maximum speed setting and the speed control command, as detailed above.

In step 320, module 108 may monitor the one or more operating conditions of implement 16. For example, module 108 may receive the auxiliary hydraulic pressure signal 112 from pressure sensor 60. It is understood that module 108 may monitor any of the one or more operating conditions of implement 16 as desired.

In step 325, module 108 may determine whether the one or more operating conditions of implement 16 are outside of a predetermined operating range (e.g., outside the optimal operating range, as described above). For example, module 108 may determine whether the auxiliary hydraulic pressure is above a first threshold (e.g., the high threshold) or below a second threshold (e.g., the low threshold). If the operating conditions are not outside the predetermined operating range (step 325: NO), module 108 may continue to monitor the operating conditions of implement 16 (step 320). For example, if the operating conditions indicate that the implement 16 is operating in the optimal operating range, module 108 may continue to monitor the operating conditions without changing the speed of vehicle 10.

In step 330, if the one or more operating conditions are outside the predetermined operating range (step 325: YES), module 108 may automatically adjust the speed of vehicle 10. For example, if the auxiliary hydraulic pressure increases to, or above, the first threshold (e.g., the high threshold), module 108 may reduce the speed of vehicle 10 such that the auxiliary hydraulic pressure reduces back to the optimal operating range (e.g., below the first threshold and above the second threshold). Similarly, if the auxiliary hydraulic pressure decreases to, or below, the second threshold (e.g., the low threshold), module 108 may increase the speed of vehicle 10 such that the auxiliary hydraulic pressure increases back to the optimal operating range. Thus, module 108 may automatically control the speed of vehicle 10 based on the one or more operating conditions of implement 16 such that the operating conditions are maintained in the optimal operating range.

In some instances, the operating conditions of implement 16 may continue to increase further above the high threshold or further below the low threshold (e.g., the pressure in auxiliary hydraulic circuit 24 increases above the stall threshold), the implement 16 may stall or begin to stall (e.g., the operating conditions of implement 16 indicate a stall condition). Thus, as detailed below with reference to FIG. 4, automatic vehicle speed control system 100 may automatically control the creep (e.g., the speed) of vehicle 10 to move vehicle 10 in the non-work direction such that the stall condition no longer exists and the implement 16 operates in the optimal operating range again.

Figure 4:
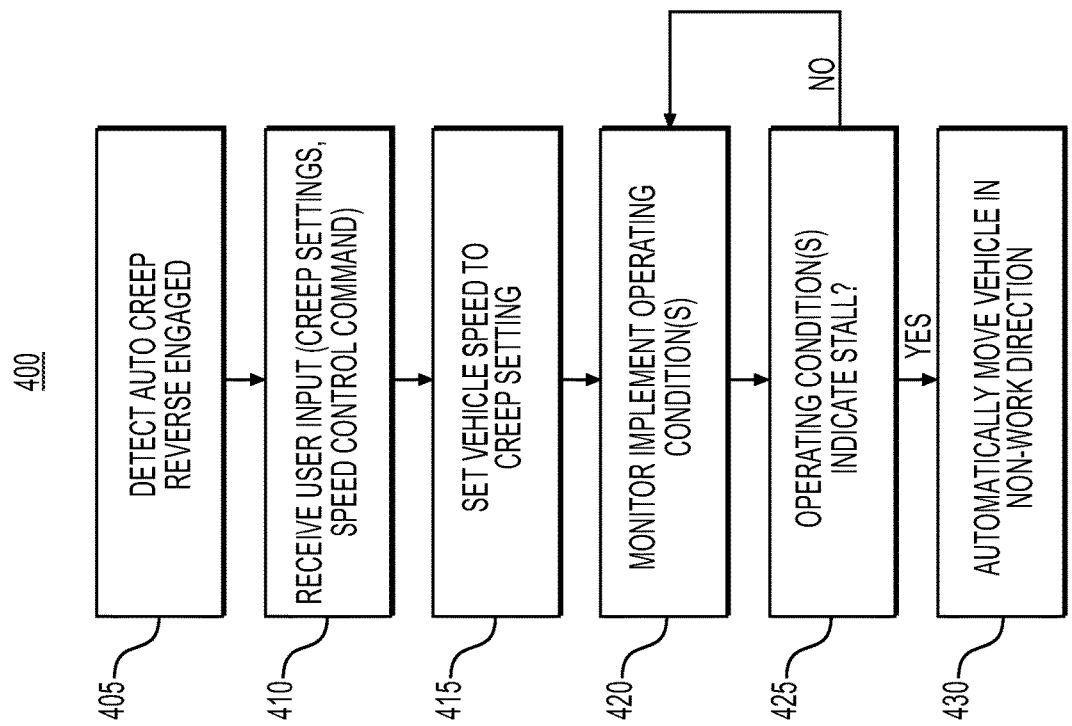
FIG. 4 provides a flowchart depicting another exemplary method for automatically controlling speed for the vehicle of FIG. 1.

FIG. 4 illustrates a flowchart depicting an exemplary method 400 for automatic controlling speed of vehicle 10. While the methods 300 and 400 are described separately herein, it is understood that the methods 300 and 400 may be performed simultaneously or otherwise in conjunction with each other. For example, an operator may desire to activate the auto creep control command and the auto creep reverse command for the same task. Further, methods 300 and 400 include similar steps. For example, steps 410-420 of method 400 may correspond to steps 310-320 of method 300.

In step 405, module 108 may detect an automatic (auto) creep reverse command is engaged. For example, module 108 may receive user input 110 of the automatic creep reverse command via a switch, a button, a knob, a computer input, or the like. In some embodiments, the automatic creep reverse may be engaged by default (e.g., when the creep mode is engaged). Further, in some embodiments, the steps below (e.g., steps 410-430) may be performed without first detecting the auto creep reverse command is engaged. For example, steps 410-430 may be initiated by means other than engaging a creep mode of vehicle 10.

In step 410, when module 108 has detected auto creep reverse is engaged, module 108 may receive the user input 110 of the creep settings and the speed control command, as detailed above with respect to FIG. 3.

In step 415, module 108 may set the speed of vehicle 10 to the creep setting (e.g., the predetermined maximum speed or a percentage thereof), as detailed above with respect to FIG. 3.

In step 420, module 108 may monitor the one or more operating conditions of implement 16, as detailed above with respect to FIG. 3.

In step 425, module 108 may determine whether the one or more operating conditions of implement 16 indicate stall of implement 16. For example, module 108 may determine whether the one or more operating conditions are above or below a third threshold (e.g., the stall threshold). For example, module 108 may determine whether the auxiliary hydraulic pressure is above the third threshold. If the operating conditions do not indicate stall of implement 16 (step 425: NO), module 108 may continue to monitor the operating conditions of implement 16 (step 420). For example, if the operating conditions indicate that the implement 16 is operating in the optimal operating range, module 108 may continue to monitor the operating conditions without changing the direction of vehicle 10. In some embodiments, if the operating conditions indicate the implement 16 is operating below the stall threshold, but above the high threshold, module 108 may adjust (e.g., reduce) the speed of vehicle 10, according to method 300 above.

In step 430, if the one or more operating conditions indicate stall of implement 16 (step 425: YES), module 108 may automatically move the vehicle in the non-work direction. For example, if the auxiliary hydraulic pressure increases to, or above, the third threshold (e.g., the stall threshold), module 108 may reverse the direction of vehicle 10 such that the auxiliary hydraulic pressure reduces back to the optimal operating range (e.g., below the first threshold and above the second threshold). Module 108 may then move the vehicle 10 in the work direction at the creep settings when the stall condition does not exist. Thus, module 108 may automatically control the movement of vehicle 10 based on the one or more operating conditions of implement 16 such that stall of implement 16 is eliminated or no longer exists and the implement 16 is operated in the optimal operating range. In some embodiments, module 108 may move the vehicle 10 in the non-work direction at a predetermined speed, for a predetermined distance (e.g., 15-20 inches) and/or for a predetermined amount of time (e.g., 2-4 seconds) prior to moving again in the work direction. The predetermined speed, the predetermined distance and the predetermined amount of time may be set according to the creep reverse settings, as detailed above. If the stall condition still exists when module 108 has moved vehicle 10 in the non-work direction for the predetermined distance and/or the predetermined amount of time, module 108 may automatically end the auto creep reverse such that the vehicle 10 stops moving. This allows the operator to intervene and manually reduce or end the stall condition (e.g., change direction of the auxiliary hydraulic circuit 24, dislodge an impediment, etc.). It is understood that these alternative methods of reducing or ending the stall condition may also be performed automatically by module 108. For example, module 108 may automatically change the direction of the auxiliary hydraulic circuit 24 to dislodge impediments.

Figure 5:
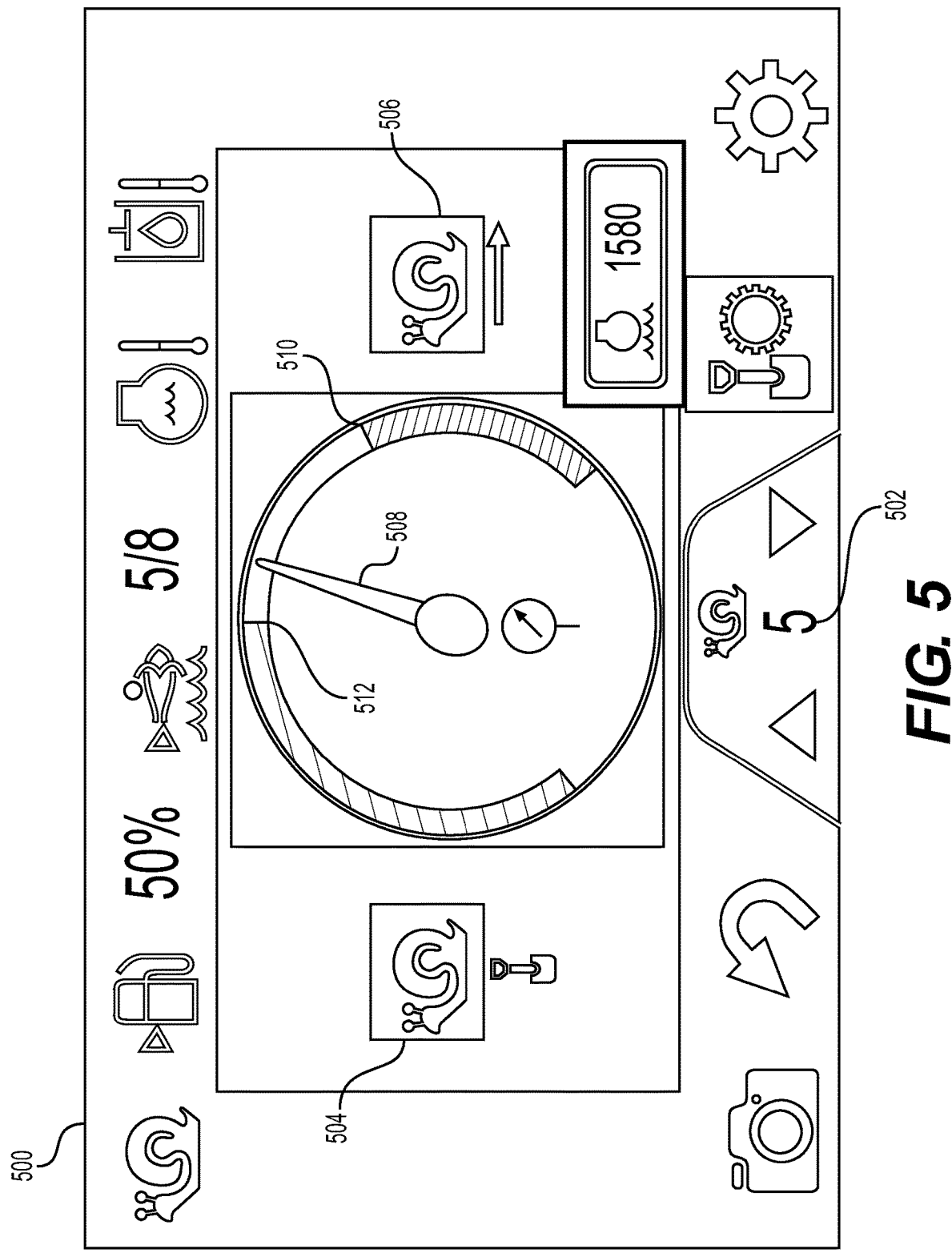
FIG. 5 is an exemplary user interface for implementing aspects of the automatic vehicle speed control system of FIGS. 1 and 2.

FIG. 5 illustrates an exemplary user interface 500 displayed on the one or more operator interfaces 22 (e.g., on a display of vehicle 10) for implementing aspects of the disclosure. It is understood that user interface 500 may be displayed in vehicle 10 and/or may be displayed remote from vehicle 10 (e.g., on a computing device remote from vehicle 10). Further, it is understood that the functions of user interface 500 described below may be performed by other operator interfaces 22, such as physical buttons, knobs, switches, gauges, or the like.

User interface 500 may include a creep setting indicator 502, an auto creep control input 504, an auto creep reverse input 506, and an operating condition indicator 508. The creep setting indicator 502 may indicate the set predetermined maximum speed setting as input by the operator. For example, the "5" shown by the creep setting indicator 502 may correspond to the predetermined maximum speed setting for setting "5." An operator may manually change the creep setting (e.g., by pressing the up or down arrows adjacent the creep setting indicator 502). The auto creep control input 504 may include a button or similar activation device that activates the auto creep control. For example, the operator may press or otherwise activate the auto creep control input 504 and module 108 may receive the auto creep control command, as detailed above. Similarly, the auto creep reverse input 506 may include a button or similar activation device that activates the auto creep reverse. For example, the operator may press or otherwise activate the auto creep reverse input 506 and module 108 may receive the auto creep reverse command, as detailed above. It is understood that the auto creep control input 504 and the auto creep reverse input 506 may be activated individually (e.g., such that module 108 performs methods 300 and 400 individually) and/or may be activated simultaneously or otherwise in conjunction such that module 108 performs methods 300 and 400 in conjunction. Thus, the auto creep control and the auto creep reverse may be selectively activated by an operator as desired.

The operating condition indicator 508 may indicate a current measurement of one or more operating conditions. For example, the operating condition indicator 508 may include a gauge (e.g., or a representation of a gauge), or similar device, for indicating the current measurement of auxiliary hydraulic pressure as indicated by auxiliary hydraulic pressure signal 112 received from sensor 60. The operating condition indicator 508 may also indicate the first threshold (e.g., a high threshold 510) and the second threshold (e.g., a low threshold 512). Thus, operating condition indicator 508 may indicate the optimal operating range (e.g., between high threshold 510 and low threshold 512). Accordingly, operating condition indicator 508 may indicate the optimal operating range, a high range above the high threshold 510, and a low range below the low threshold 512 for a given operating condition of implement 16 (e.g., auxiliary hydraulic pressure of auxiliary hydraulic circuit 24). The optimal operating range, the high range, and the low range may be differentiated by different colors, shading, or the like. For example, the optimal operating range may be indicated as green, the high range may be indicated as red, and the low range may be indicated as yellow.

Automatic vehicle speed control system 100 may provide automatic and proactive control of creep (e.g., speed) for vehicle 10. For example, automatic vehicle speed control system 100 may automatically control speed of vehicle 10 to reduce or increase the speed of vehicle 10 based on the one or more operating conditions of implement 16 during a creep mode of vehicle 10. In this way, system 100 may ensure that implement 16 is operated in the optimal operating range. Accordingly, system 100 may enable optimal or increased productivity of implement 16 such that the task is performed faster and/or more efficiently than manual control. Such a system 100 may create a more intuitive operator control and may allow more autonomy of the vehicle 10. Thus, the automatic vehicle speed control system 100 of the present disclosure may help operators execute various tasks, such as cold planing or the like, may reduce operator effort/fatigue, may increase safety, and may help to reduce and/or prevent stall of implement 16.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An automatic vehicle speed control system for use in a vehicle having an implement, comprising:
    a controller configured to:
        set a speed of the vehicle based on a creep setting associated with a maximum speed setting;
        monitor one or more operating conditions of the implement; and
        automatically adjust the speed of the vehicle below the maximum speed setting based on the one or more operating conditions of the implement and the creep setting.

2. The automatic vehicle speed control system of claim 1, wherein the creep setting includes a plurality of predetermined maximum speeds that include the maximum speed setting.

3. The automatic vehicle speed control system of claim 2, wherein the creep setting is set by an operator of the vehicle.

4. The automatic vehicle speed control system of claim 1, wherein the one or more operating conditions includes a pressure of an auxiliary hydraulic circuit for the implement.

5. The automatic vehicle speed control system of claim 1, wherein the controller is further configured to:
    determine whether the one or more operating conditions are outside a predetermined operating range; and
    in accordance with a determination that the one or more operating conditions are outside the predetermined operating range, automatically adjust the speed of the vehicle.

6. The automatic vehicle speed control system of claim 5, wherein the controller is further configured to:
    decrease the speed of the vehicle below the maximum speed setting if the one or more operating conditions are above or below a first threshold; and
    increase the speed of the vehicle when the speed of the vehicle is below the maximum speed setting if the one or more operating conditions are above or below a second threshold.

7. The automatic vehicle speed control system of claim 1, further comprising an operating condition indicator, wherein the controller is configured to:
    output an indication of the one or more operating conditions via the operating condition indicator.

8. The automatic vehicle speed control system of claim 7, wherein the operating condition indicator indicates an optimal operating range of the one or more operating conditions.

9. The automatic vehicle speed control system of claim 1, wherein the controller is further configured to:
    receive an input of a type of implement, wherein the maximum speed setting is based on the type of implement.

10. The automatic vehicle speed control system of claim 1, wherein the controller is further configured to:
    automatically move the vehicle in a non-work direction based on the one or more operating conditions indicating a stall condition of the implement.

11. An automatic vehicle speed control system for use in a vehicle having an implement, comprising:
    an operator interface; and
    a controller configured to:
        set a speed of the vehicle to a creep setting in a work direction based on a creep setting user input from the operator interface;
        determine whether a stall condition exists for the implement; and
        in accordance with a determination that the stall condition exists, automatically move the vehicle to eliminate the stall condition.

12. The automatic vehicle speed control system of claim 11, wherein the creep setting includes a predetermined maximum speed.

13. The automatic vehicle speed control system of claim 11, wherein the controller is further configured to:
    determine whether one or more operating conditions of the implement indicate the stall condition; and
    in accordance with a determination that the one or more operating conditions indicate the stall condition, automatically move the vehicle to eliminate the stall condition.

14. The automatic vehicle speed control system of claim 11, wherein the controller is configured to:
    automatically move the vehicle in a non-work direction when automatically moving the vehicle to eliminate the stall condition.

15. The automatic vehicle speed control system of claim 14, wherein the controller is configured to:
    automatically move the vehicle in the non-work direction for a predetermined distance and/or a predetermined amount of time.

16. The automatic vehicle speed control system of claim 15, wherein the controller is further configured to:
    receive an input of a type of implement, wherein the predetermined distance and/or the predetermined amount of time are based on the type of implement.

17. The automatic vehicle speed control system of claim 11, further comprising an operating condition indicator, wherein the controller is configured to:

output an indication of one or more operating conditions of the implement via the operating condition indicator.

18. The automatic vehicle speed control system of claim 11, wherein the controller is further configured to:
monitor one or more operating conditions of the implement; and
automatically adjust the speed of the vehicle based on the one or more operating conditions of the implement.

19. A method for automatically controlling speed of a vehicle, the method comprising:
setting a speed of the vehicle in a work direction based on a creep setting;
moving the vehicle in the work direction with the creep setting having a maximum speed, the speed of the vehicle being limited to the maximum speed;
monitoring one or more operating conditions of an implement of the vehicle;
automatically reducing the speed of the vehicle below the maximum speed based on the one or more operating conditions of the implement;
determining whether a stall condition exists for the implement; and
in accordance with a determination that the stall condition exists, automatically moving the vehicle in a non-work direction.

20. The method of claim 19, wherein the non-work direction is opposite the work direction such that the vehicle automatically moves in reverse.

* * * * *